United States Patent [19]
Wheatley et al.

[11] 3,957,959

[45] May 18, 1976

[54] PROCESS FOR PRODUCING FLUOSULFONIC ACID

[75] Inventors: Roger Warren Wheatley, Ogden Dunes; Duane Eugene Treadway, Crown Point; Ralf Gerrit Toennies, Lowell, all of Ind.

[73] Assignee: E. I. Du Pont de Nemours and Company, Wilmington, Del.

[22] Filed: Nov. 7, 1974

[21] Appl. No.: 521,918

[52] U.S. Cl. ............................ 423/467; 423/512 R
[51] Int. Cl.² .................. C01B 17/45; C01B 17/46
[58] Field of Search ............... 423/467, 462, 512

[56] References Cited
UNITED STATES PATENTS

| | | | |
|---|---|---|---|
| 2,430,963 | 11/1947 | Stephenson et al.............. | 423/467 |
| 2,447,476 | 8/1948 | Kulka........................... | 423/467 X |

FOREIGN PATENTS OR APPLICATIONS

| | | | |
|---|---|---|---|
| 449,650 | 7/1948 | Canada........................ | 423/467 |
| 496,658 | 12/1938 | United Kingdom............. | 423/512 |

*Primary Examiner*—Edward Stern

[57] ABSTRACT

Fluosulfonic acid ($HSO_3F$) is made by the steps of (1) introducing liquid $SO_3$ and liquid HF separately into a stream of fluosulfonic acid to produce additional fluosulfonic acid, (2) cooling the fluosulfonic acid, and (3) recycling fluosulfonic acid to step (1). Anhydrous liquid HF and liquid $SO_3$ are added to the fluosulfonic acid in step (1) in such proportions as to achieve a desired purity in the resulting product.

7 Claims, 1 Drawing Figure

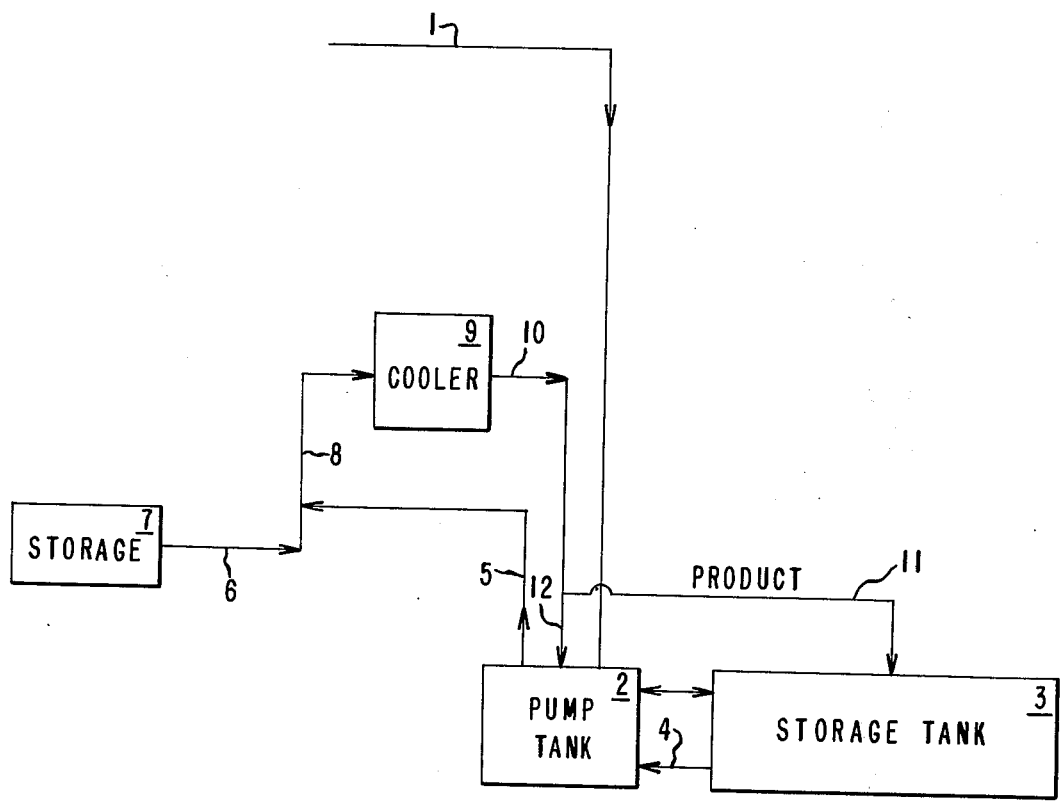

PROCESS FOR PRODUCING FLUOSULFONIC ACID

BACKGROUND OF THE INVENTION

This invention relates to a process for producing fluosulfonic acid from hydrogen fluoride and sulfur trioxide.

British Pat. specification No. 496,658 discloses a process for manufacturing fluosulfonic acid comprising continuously passing $SO_3$ and HF in equivalent quantities through a reaction tube. It is stated that the reactants may both be liquid or gaseous or one may be liquid and the other gaseous.

U.S. Pat. No. 2,430,963, issued to Stephenson et al. on Nov. 27, 1944, is directed to a process for making fluosulfonic acid by combining a substantially anhydrous liquid consisting of fluosulfonic acid and dissolved HF with a substantially anhydrous liquid mixture consisting of fluosulfonic acid and dissolved $SO_3$. The liquor containing HF is made by feeding anhydrous HF gas into contact with fluosulfonic acid in any suitable gas-liquid contacting apparatus. The liquid mixture containing $SO_3$ can be made by distilling commercial oleum in such a way as to form a substantially 100% $SO_3$ gas and dissolving the $SO_3$ in fluosulfonic acid.

In general, processes involving reaction of HF and $SO_3$ gases require bulky gas handling and absorbing facilities. Removal of latent heats of gaseous reactants is also necessary. Moreover, since HF and $SO_3$ are usually shipped in the liquid state, gas phase reactions require additional equipment and energy expenditure to convert the liquids to the gaseous state. Producing a fluosulfonic acid product which does not contain a significant excess of one of the reactants is difficult because of the substantial solubility of both HF and $SO_3$ in fluosulfonic acid, fluctuation in the HF and $SO_3$ content of commercial raw materials, and mchanical difficulties mechanical controlling the end point of the reaction. Moreover, the particular reactant in excess and the amount of it are often uncontrollable and result in a product of inconsistent composition. Hence, there is a continual need in the art for processes which allow the production of fluosulfonic acid of controllable purity.

SUMMARY OF THE INVENTION

A process for producing fluosulfonic acid from liquid $SO_3$ and liquid HF has been discovered.

Specifically, it has been found that fluosulfonic acid can be made by a process comprising the steps of (1) adding liquid $SO_3$ and anhydrous liquid HF separately to a stream of fluosulfonic acid to produce additional fluosulfonic acid, (2) cooling the fluosulfonic acid, and (3) recycling fluosulfonic acid to step (1). Liquid $SO_3$ and anhydrous liquid HF are added in step (1) in such proportions that a desired purity in the resulting product is achieved.

Since the process of the invention is operated in the liquid phase, it alleviates the need for bulky gas handling and absorption facilities and does not require equipment for evaporation of the starting materials. Furthermore, the present process allows fluosulfonic acid to be produced with controlled purity.

BRIEF DESCRIPTION OF THE DRAWING

The drawing is a schematic diagram of a preferred embodiment of the invention.

DETAILED DESCRIPTION OF THE INVENTION

Fluosulfonic acid, liquid $SO_3$ and anhydrous liquid HF are commercially available. Purity of the final product is determined by the amount of HF or $SO_3$ desired to be in excess and by the impurities in the raw materials. Since commercially available liquid $SO_3$ and anhydrous liquid HF are of relatively high purity, they are suitable for producing fluosulfonic acid having a purity of 98% by weight or more. If a non-commercial source of $SO_3$, such as the distillation of oleum to obtain $SO_3$, or of HF, such as crude or wet HF from a HF production unit, is utilized, the impurities in the raw materials will usually result in lower purity in the fluosulfonic acid product. For the purposes of this invention, any source of liquid $SO_3$ and liquid HF is suitable provided that the contaminants in the starting materials are acceptable to the user of the final product.

In the process of the invention the reactants, liquid $SO_3$ and anhydrous liquid HF are added separately to a recirculating or recycle stream of fluosulfonic acid so as to produce additional fluosulfonic acid. The reactants may be added in any order; however, it is preferred to add $SO_3$ to fluosulfonic acid first and to add the anhydrous hydrogen fluoride last in order to minimize corrosion of process equipment. Preferably, temperature is maintained between about 0°C. to about 120°C. and pressure is maintained above the vapor pressure of HF in the zone of reaction while additional fluosulfonic acid is produced.

The process can be operated in a continuous manner with continuous addition of both hydrogen fluoride and $SO_3$ to the recirculating stream and with continuous removal of fluosulfonic acid as product in an amount equal to the additional acid produced.

Alternatively, liquid $SO_3$ can be added to a fluosulfonic acid stream to achieve a concentrated solution, e.g. 50 to 70% $SO_3$ by weight, of $SO_3$ in fluosulfonic acid. This solution can be passed to a reaction chamber or vessel wherein liquid hydrogen fluoride is fed at a controlled rate to the stream. The fluosulfonic acid solution of $SO_3$ can then be recycled through the reaction chamber until reaction has been carried to a desired level of completion after which a portion of the product can be removed and the remainder recycled for continued use in the process. During each cycle through the reaction chamber liquid HF is added in such proportion that heat of reaction generated can be easily removed by recycling the fluosulfonic acid solution through a suitable heat exchanger.

In the preferred embodiment of the invention liquid $SO_3$ is fed into a recirculating stream of fluosulfonic acid to produce a solution of $SO_3$ in the acid. Although the concentration of sulfur trioxide in the solution can vary up to the limit of solubility of sulfur trioxide in fluosulfonic acid, it is preferred to maintain the $SO_3$ concentration below about 10% by weight in excess and preferably at about 1 to 4% by weight in excess of the concentration of $SO_3$ desired in the final product. Concentrations greatly in excess of the upper limit would significantly increase the reaction temperature and thereby create enhanced equipment corrosion problems.

Liquid anhydrous hydrogen fluoride is then introduced into the stream of fluosulfonic acid containing $SO_3$ to produce additional fluosulfonic acid. Addition is made at a rate which will maintain purity of the resulting fluosulfonic acid at a desired level. Temperature is maintained above the freezing point of the various fluosulfonic acid solutions present in the process and below the boiling point of the fluosulfonic acid. The temperature during reaction is preferably from about 0°C. to 120°C., and, more preferably, from about 20°C. to 60°C. Temperatures in excess of about 120°C. present corrosion problems which are difficult to circumvent when conventional process materials are being used. Within the preferred temperature range corrosion is kept to a minimum.

Since the process of the invention is exothermic, means must be used to maintain the temperature within the above-prescribed range. Suitable control of the temperature can be achieved by recycling the fluosulfonic acid stream at a rate such that the quantity of recycled fluosulfonic acid is about 10–100 times greater than the quantity of fluosulfonic acid being formed. Heat of reaction can be removed from the fluosulfonic acid stream by passing it through any suitable heat exchange equipment, preferably situated after the zone of reaction. With a fluosulfonic acid solution having a $SO_3$ content below about 10 percent by weight in excess of the $SO_3$ concentration desired in the final product, the flow rate of the solution can easily be adjusted to maintain temperature of reaction within the preferred range.

The production of additional fluosulfonic acid is preferably accomplished at a pressure which is greater than the vapor pressure of hydrogen fluoride at the particular temperature of operation. By maintaining the pressure above this level, flashing, i.e., rapid vaporization, of hydrogen fluoride is avoided. Such flashing leads to delayed reaction and pressure surges in the process.

In the process of the invention the amount of reactants remaining as impurities in the final product can be controlled by regulating the rate of addition of either of the reactants so as to maintain the density of the product at a value which gives the desired purity level. For example, at 30.0°C. a density of 1.7163 will result from a fluosulfonic acid product containing 0.5% $SO_3$ by weight, whereas a density of 1.7117 will result from having 0.5% HF by weight in the product. When controlling the purity of the product by measuring its density at constant temperature, it is important that the impurity content of the starting materials remain relatively constant, since the density-purity relationship must be empirically established.

Hence, by controlling density, fluosulfonic acid having the usual commercial content of about 98.5% fluosulfonic acid by weight and less than 1% by weight of $SO_3$ can be conveniently made by the present process. In addition, fluosulfonic acid of essentially pure content, e.g., 99.8–99.9% fluosulfonic acid by weight, can also be made by proper regulation of the flow rate of either reactant as described herein. As used herein and in the claims "fluosulfonic acid of a desired purity" or "fluosulfonic acid of a desired purity level" means fluosulfonic acid product having a particular content of fluosulfonic acid and $SO_3$ or HF according to the requirements of some intended end use. It is preferred to operate the process of the invention to produce a fluosulfonic acid product having less than 1% $SO_3$ by weight in excess with the remainder being fluosulfonic acid.

After the reactants have combined in the recirculating stream to produce additional fluosulfonic acid, the stream is passed to a cooler consisting of suitable heat exchange equipment where the temperature is reduced preferably to about the temperature of the initial fluosulfonic acid stream, e.g., about 15°–40°C. Fluosulfonic acid is then withdrawn as product in an amount about equal to the additional fluosulfonic acid produced, while the remainder of the stream is recycled through the process for continued use.

In the preferred embodiment shown in the drawing fluosulfonic acid is kept in storage tank 3 from where it is passed through line 4 into pump tank 2. Liquid $SO_3$ enters pump tank 2 via line 1 to form a solution of $SO_3$ in fluosulfonic acid. This solution is passed through line 5 into line 8 where it meets anhydrous liquid HF coming from storage tank 7 via line 6.

Temperature in line 8 is maintained between about 0°C. and 120°C. and pressure is kept greater than the vapor pressure of HF at the particular temperature. The liquid $SO_3$ and liquid HF combine in line 8 to produce additional fluosulfonic acid which is passed along with the original stream into cooler 9 where any necessary cooling of the product fluosulfonic acid is performed. Fluosulfonic acid leaving cooler 9 via line 10 is separated into a withdrawal stream passing through line 11 into storage tank 3 and a recycle stream which passes through line 12 into pump tank 2 for further use in the process. The equipment used in this process can be conveniently constructed from carbon steel.

Fluosulfonic acid prepared by the process of the invention is useful in any application in which prior art fluosulfonic acid has been employed, such as a catalyst in the polymerization of tetrahydrofuran.

The invention is further described by the following examples in which all percentages are by weight unless otherwise indicated.

EXAMPLE

Referring to the drawing, a stream of fluosulfonic acid from pump tank 2 was established in lines 5, 8 and 12 with the flow rate in line 5 being 13,900 grams per second (127 gallons per minute). Liquid $SO_3$ from line 1 was fed at a rate of 290 grams per second (2303 pounds per hour) into the stream of fluosulfonic acid at a temperature of 19°C. in pump tank 2 to produce a solution having 2.4 % $SO_3$ in fluosulfonic acid.

The solution of $SO_3$ in fluosulfonic acid was then passed through line 5 into line 8 where anhydrous, liquid HF was added from storage tank 7 via line 6 at a flow rate of 72 grams per second and a pressure of 2800 grams per square centimeter. Reaction between HF and $SO_3$ to produce additional fluosulfonic acid occurred in line 8 causing a temperature rise to 34°C. The resulting fluosulfonic acid was passed to cooler 9 where its temperature was reduced to 19°C. and then was passed into line 10. A portion of the product passing through line 10 was withdrawn via line 11 at a flow rate of 362 grams per second while the remainder was passed through line 12 into pump tank 2 for recycling through the process. A sample of the fluosulfonic acid passing through line 10 was withdrawn in order to measure its density which was maintained at 1.7325 at 21.2°C. by controlling the feed rate of liquid HF while $SO_3$ flow was maintained at the value given above. This density resulted in a product having 0.35% $SO_3$ in excess. The density of the fluosulfonic acid was measured with a density meter made by Automation Product Company and which was calibrated empirically by measuring at constant temperature the density of fluosulfonic solutions of known composition.

The $SO_3$ and HF feed rates were adjusted to give a density of 1.7336, resulting in a product having an excess $SO_3$ content of 0.90%.

We claim:

1. A process for producing fluosulfonic acid comprising the steps of (1) adding liquid $SO_3$ and anhydrous liquid HF separately to a stream of fluosulfonic acid to form additional fluosulfonic acid, (2) cooling the fluosulfonic acid and (3) recycling fluosulfonic acid to step (1) at a rate about 10 to 100 times greater than the rate of formation of fluosulfonic acid; said $SO_3$ and HF being added to fluosulfonic acid in step (1) in controlled proportions to maintain constant the density of the resulting product measured at constant temperature and with an essentially constant impurity content in the starting materials.

2. The process of claim 1 wherein step (1) is conducted at a temperature of from about 0°C. to about 120°C. and at a pressure greater than the vapor pressure of HF.

3. A continuous process for producing fluosulfonic acid of controlled purity comprising the steps of (1) introducing liquid $SO_3$ into a stream of fluosulfonic acid to produce a solution thereof, (2) adding anhydrous liquid HF to said solution to form additional fluosulfonic acid at a pressure greater than the vapor pressure of HF, (3) cooling the fluosulfonic acid, and (4) recycling a portion of the fluosulfonic acid to step (1) at a rate about 10 to 100 times greater than the rate of formation of fluosulfonic acid; said $SO_3$ and HF being added to fluosulfonic acid in steps (1) and (2), respectively, in controlled proportions to maintain constant the density of the resulting product measured at constant temperature and with an essentially constant impurity content in the starting materials.

4. The process of claim 3 wherein temperature in step (2) is from about 0°C. to about 120°C.

5. The process of claim 4 wherein the solution of $SO_3$ in fluosulfonic acid formed in step (1) has a $SO_3$ concentration of less than about 10% by weight in excess of the $SO_3$ concentration in the product.

6. The process of claim 4 wherein the temperature in step (2) is from about 20°C. to 60°C.

7. The process of claim 6 wherein the solution of $SO_3$ in fluosulfonic acid formed in step (1) has a $SO_3$ concentration of about 1 to about 4% by weight in excess of the $SO_3$ concentration in the product.

* * * * *